United States Patent [19]

Tokarz

[11] 4,385,519
[45] May 31, 1983

[54] WATER LEVEL SENSOR AND TEMPERATURE PROFILE DETECTOR

[75] Inventor: Richard D. Tokarz, West Richland, Wash.

[73] Assignee: The United States of America as represented by the United States Department of Energy, Washington, D.C.

[21] Appl. No.: 229,423

[22] Filed: Jan. 29, 1981

[51] Int. Cl.³ .................. G01K 3/14; G01K 5/42; G01F 23/22
[52] U.S. Cl. ................................. 73/295; 374/110
[58] Field of Search .............. 73/342, 295, 368.7, 73/362 AR, 301; 376/247, 259, 245

[56] References Cited

U.S. PATENT DOCUMENTS

| | | | |
|---|---|---|---|
| 2,019,058 | 10/1935 | Rippe | 73/368.7 |
| 2,713,793 | 7/1955 | Andersen | 73/301 |
| 3,153,342 | 10/1964 | Pierce | 73/301 |
| 3,500,687 | 3/1970 | Smith | 73/295 |
| 4,307,606 | 12/1981 | Johnson | 73/295 |

Primary Examiner—Charles A. Ruehl
Assistant Examiner—Denis E. Corr

[57] ABSTRACT

A temperature profile detector comprising a surrounding length of metal tubing and an interior electrical conductor both constructed of high temperature high electrical resistance materials. A plurality of gas-filled expandable bellows made of electrically conductive material is electrically connected to the interior electrical conductor and positioned within the length of metal tubing. The bellows are sealed and contain a predetermined volume of a gas designed to effect movement of the bellows from an open circuit condition to a closed circuit condition in response to monitored temperature changes sensed by each bellows.

2 Claims, 3 Drawing Figures

WATER LEVEL SENSOR AND TEMPERATURE PROFILE DETECTOR

The U. S. government has rights in this invention pursuant to contract to contact No. EY-76-C-06-1830 between the U. S. Department of Energy and Battelle Memorial Institute.

BACKGROUND OF THE INVENTION

This disclosure relates to a sensor for determining the physical profile of temperature rises to a pre-determined temperature. It is capable of providing a profile of temperature rises spreading through an adjacent heated element. The device further serves as an indictor of liquid level in systems subjected to overheating.

This invention arose from tests requiring measurement of selected operational parameters within nuclear fuel bundles. It meets projected fuel bundle instrumentation requirements for development of elevated temperature profiles along the length of a fuel bundle. This is desirable in the design, testing and use of a fuel bundle in order to provide a temperature profile at temperatures approaching that at which fuel rod melt down would occur. Such measurements can be accomplished conventionally by the use of multiple theremocouples but their costs and electrical connector requirements make such use prohibitive in actual practice.

One item of information that has not been available in operating reactors to date is the meltdown temperature profile within a core. The present invention is capable of developing this profile during test operation of instrumented fuel bundles for guidance of those designing future reactors. A second important parameter in such tests to meltdown temperatures is measurement of water level in the reactor or in a specific test bundle. The present disclosure will provide both types of information and will provide continuous readout up to a very high temperature at which the device would be destroyed. Even is this extreme case, some readout capability will be retained by that portion of the sensor which is not destroyed.

The present device utilizes two or more elongated electrical conductors arranged so as to be positionable immediately alongside fuel rods or other elongated elements. It includes a plurality of gas-filled expandable conductors fixed at discrete locations along the conductors. Each expandable conductor is independently movable relative to the conductors between a first position in which an open circuit exists across it and a second position in which it operably bridges the conductors in a low resistance circuit. The changes in resistance between the two conductors that result from such bridging can be monitored and measured from both ends of both conductors to provide a temperature profile that indicates the spread of the preselected temperature. Furthermore, when the active length of the device is at least partially submerged in overheated or boiling liquid, the resulting temperature profile serves as an effective indication of liquid level, since a very distinct difference occurs between the temperature of the boiling liquid and the temperature of the vapors or gases immediately above its surface.

SUMMARY OF THE INVENTION

The disclosed equipment includes two or more elongated electrical conductors spaced apart from one another and arranged in parallel side by side or concentric positions. Each conductor overlaps at least a portion of the length of the other. A plurality of gas-filled expandable conductors are fixed along the active lengths of the elongated electrical conductors. Each expandable conductor is independently movable relative to the conductors in response to sensed temperature changes. They are movable between first positions in which an open circuit exists across the expandable conductors and second positions in which they operably bridge the elongated conductors in low resistance circuits.

It is an object of this invention to provide a relatively inexpensive detector for monitoring physical spread of predetermined elevated temperatures along an elongated member without the use of expensive multiple thermocouples. Another object of this invention is to provide a reusable detector for high temperature monitoring purposes.

Another object of the invention is to provide a reversible detector which is capable also of providing effective indication of liquid level where the temperature of gaseous material above a liquid is significantly different from the liquid temperature.

DESCRIPTION OF THE PREFERRED EMBODIMENT

Figure 1:
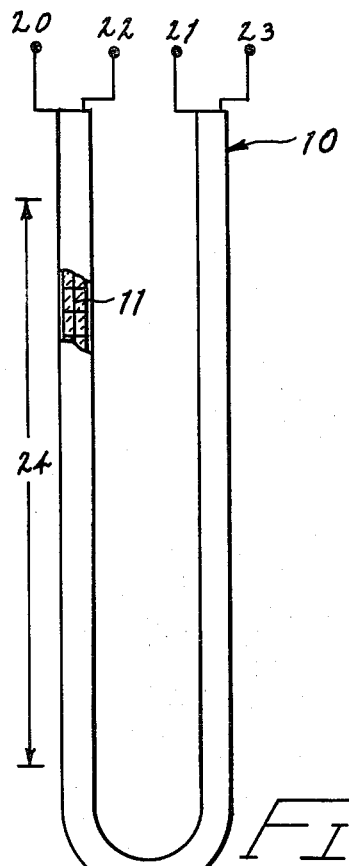
FIG. 1 is an elevation view of the detector with a portion of its outer walls broken away.

The general structure of the liquid level sensor and temperature profile detector is illustrated in the drawings, but is subject to many physical modifications. The basic arrangement involves the use of two elongated electrical conductors through which temperature changes in the system can be monitored at external terminals. A number of gas-filled expandable electrical conductors are interposed between the elongated conductors at discrete locations along their length. Each gas-filled expandable conductor is designed to normally present an open circuit across the conductors and to be movable to a bridging position between the conductors at a predetermined elevated temperature. Movement of the expandable conductors is a function of gaseous expansion within them, which can be varied by choice of gas and pressure, as well as by the mechanical design of the expandable conductors themselves. An example of such an expandable conductor would be a folded sealed metal bellows which is normally flat, but which can extend axially in response to sensed temperature increases.

The apparatus, designed specifically for detecting predetermined high temperature conditions alongside elongated elements such as nuclear fuel rods, comprises a first elongated electrical conductor 10 and a second elongated electrical conductor 11. The conductors 10 and 11 are illustrated in FIG. 1 as being bent in an elongated U-shaped configuration with their extreme ends at a common elevation. The conductors 10 and 11 have connector terminals 20, 21 and 22, 23 connected respectively to them.

As shown in FIG. 1, the left hand upright leg of the elongated conductors is the active temperature sensing area of the apparatus and is basically located within the length denoted by arrows 24. The right hand upright leg is a return for the conductors to provide terminal access. In the right hand leg, the conductors 10 and 11 are merely separated by insulating material.

Figure 2:
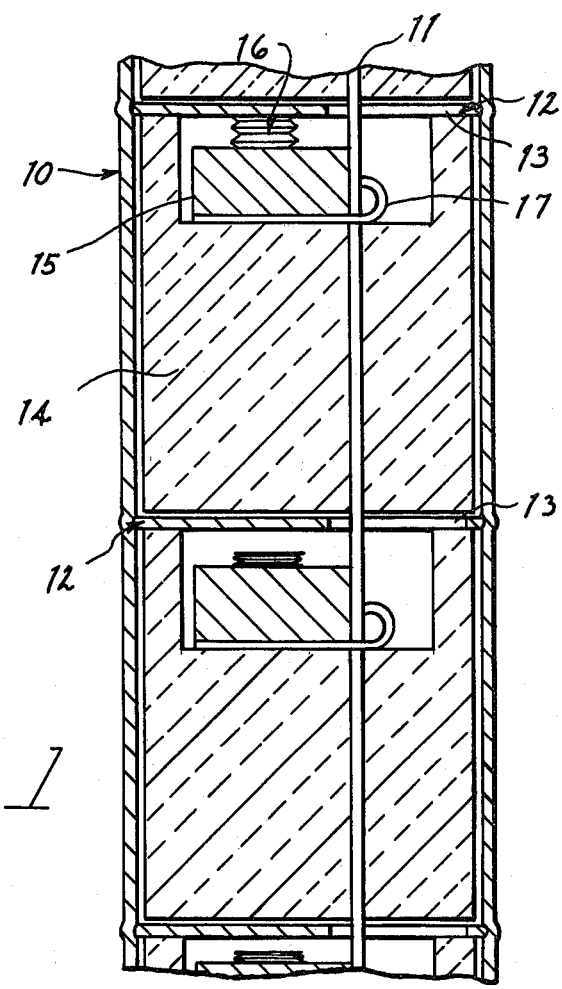
FIG. 2 is a cross-sectional longitudinal view through portions of three individual sensing units taken along line 2—2, of FIG. 3.
Figure 3:
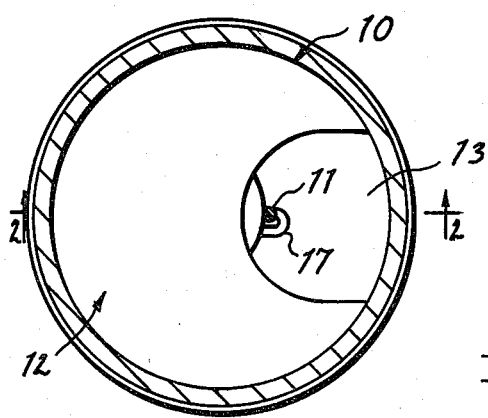
FIG. 3 is a transverse sectional view.

As shown in FIGS. 2 and 3, the active portion of the apparatus includes parallel lengths of the elongated electrical conductors 10 and 11, which overlap one another. In the illustration, the conductor 10 is a length of metal tubing or cable sheathing, while the conductor 11 is an interior length of wire or cable. At least the inner cylindrical walls of conductor 10 should be metallic or electrically conductive.

The elongated electrical conductor 10 further comprises transverse plates 12 rigidly spanning the interior walls of the tubing or sheathing, which is preferably swaged over plates 12 in a fabrication method similar to that used for the production of cladded high resistance cables. Plates 12 are electrically conductive and form a conductive circuit member in conjunction with the interior walls of tubing 10. Each plate 12 includes an open aperture 13 that has edges surrounding and spaced from conductor 11.

Segmented electrical insulators 14 are interposed between the conductors 10 and 11 to maintain them in a fixed spatial relationship. The materials used in the production of conductors 10 and 11 are preferably high resistance metals having very high melting points. A typical metal for this purpose would be tungsten.

According to this disclosure, gas-filled expandable electrical conductors are positioned at discrete locations along the active length of the apparatus designated by arrows 24. Each expandable conductor is movable in response to sensed temperature changes between a first position in which an open circuit exists across it and a second position in which it operably bridges the interior walls of tubing 10 and wire 11 in a low resistance circuit.

As shown in FIG. 2, the gas-filled expandable conductor is a small metal bellows 16 anchored to a supporting metal block 15 electrically connected to wire 11 by a conductive base 17. The bellows 16 is filled with a predetermined quantity of gas and hermetically sealed. The amount of gas within bellows 16 is such as to maintain it in the flattened or retracted condition shown toward the bottom of FIG. 2 during normal operation of the equipment being moinitored. However, by controlling the gaseous charge within each bellows 16 and its physical expandability, one can design the bellows 16 to expand and contact the overlaying surface of plate 12 at a preselected temperature. When such expansion occurs, as shown at the top of FIG. 2, the resulting low resistance path between conductors 10 and 11 can be detected by measurement of electrical resistance at the terminals 20 through 23.

When the apparatus shown in FIG. 1 is normally immersed in a liquid, the resistance measurements at terminals 20 through 23 can also be used to provide an indication of liquid level where elevated temperatures are being monitored. This is due to the fact that there are significant variations in gaseous or liquid phase temperatures immediately above the liquid surface in a sealed vessel containing boiling liquid. For instance, in a nuclear reactor, temperatures one to two inches above the liquid level will be at least 200° F. higher than the liquid temperature. By designing the the bellows 16 to maintain open circuits at least to the boiling temperature of the liquid, one can detect the elevated temperatures above the liquid surface and determine the liquid level itself from such readings. The measurement of liquid level readings must be taken upwrardly from the liquid elevation through terminals 21 and 23, since there will be a common temperature throughout the liquid from the bottom of the sensing apparatus upwardly to the liquid level elevation.

Changes can be made with respect to the illustrated details. In place of the bellows, a diaphragm or other conductive elastic surface sealing a quantity of pressurized gas can be substituted. It is preferable that the expandable conductor be designed so as to not stretch the material from which it is made beyond the elastic limits. In this manner, the detector is reversible and will indicate reduction in temperature from the predetermined high temperature conditions. Unless damaged by heating above the melting point of its elements, this apparatus is resusable.

If one desires a variable sensing system, one can externally control the pressure within the tubing 10 and thereby vary the expandablilty of the bellows 16. Since the expansion of the metal bellows is a function of their internal pressure in relation to the external pressure within tube 10, the design temperature can be varied over a meaningful range by modifying the pressure within tubing 10. This significantly increases the amount of useful data obtainable from a single sensing apparatus.

Even where upper portions of the sensing apparatus might be melted away due to the elevated temperature of a liquid level, the lower portion below the liquid level will continue to provide indications readable through the lower terminals of the elongated electrical conductors.

The apparatus can be easily fabricated by assembling the internal elements along the conductor 11 and then inserting them in a string within the length of tubing 10 having an internal diameter sized for fabrication clearance. After the tubing 10 is filled, it can be cold extruded to firmly grip the plates 12. The metal surfaces of the assembly should be etched to remove all oxidation. Caps with vent ports should be installed at each end of tubing 10 and welded in place. Then the internal portion of the tubing 10 is heated and purged with inert gas to prevent oxidation. After drying of the internal components, an appropriate backfill pressure of inert gas is left in the apparatus and the vent ports are sealed unless pressure variation control is desired.

Tube volume and tube pressure within tubing 10 must be controlled or preselected such that the actuation of the metal bellows 16 will respond as desired. This can be accomplished in a sealed length of tubing 10 by installing a free volume of gas in the return length of the apparatus which is significantly larger than the volume of gas within its active length shown between arrows 24.

In very high temperature tests or in reactors, the external pressure about the apparatus can be expected to vary over a wide range. Since the physical strength of the metal tubing 10 at very high temperatures will be extremely low, it is best to design the sensors so that the tubing pressure can be very low when heated to maximum design temperatures. This will prevent rupture of tubing 10 and subsequent failure of the sensing devices.

Having described my invention, I claim:

1. A temperature, profile detector for sensing temperatures in high temperature environments, comprising:
    an elongated tubular first electrical conductor made of conductive, high temperature resistant material having substantial electrical resistivity;

an elongated second electrical conductor made of conductive, high temperature resistant material having substantial electrical resistivity, arranged within and electrically insulated from the first electrical conductor;

a plurality of gas-filled expandable electrical conductors electrically connected to the second electrical conductor and positioned within the tubular first electrical conductor in an orientation allowing the gas-filled expandable electrical conductors to electrically contact the tubular first electrical conductor to form an electrical connection between the first and second electrical conductors; and a plurality of insulators for supporting the gas-filled expandable electric conductors and the second electrical conductor within the tubular first electrical conductor in an electrically insulated position.

2. The temperature profile detector of claim 1 further defined by said first and second electrical conductors being made of tungsten.

* * * * *